United States Patent [19]

Hendry

[11] Patent Number: 4,474,717
[45] Date of Patent: Oct. 2, 1984

[54] METHOD OF MAKING A TWIN-WALL INTERNALLY CORRUGATED PLASTIC STRUCTURAL PART WITH A SMOOTH NON-CELLULAR SKIN

[75] Inventor: James W. Hendry, Englewood, Tenn.

[73] Assignee: Lang Fastener Corporation, Roseville, Mich.

[21] Appl. No.: 381,105

[22] Filed: May 24, 1982

[51] Int. Cl.³ .................................... B29D 27/00
[52] U.S. Cl. .......................... 264/45.5; 264/45.1; 264/50; 264/505; 264/572; 264/328.16; 264/DIG. 83; 425/4 R; 425/155; 425/552; 425/812
[58] Field of Search ............... 264/DIG. 83, 50, 45.1, 264/45.5, 505, 572, 328.16; 425/155, 812, 817 R, 4 R, 552

[56] References Cited

U.S. PATENT DOCUMENTS

| | | | |
|---|---|---|---|
| 2,834,045 | 5/1958 | Davies | 264/50 X |
| 4,101,617 | 7/1978 | Friederich | 264/272 |
| 4,140,672 | 2/1979 | Kataoka | 264/DIG. 83 |
| 4,247,515 | 1/1981 | Olabisi | 264/DIG. 83 |

FOREIGN PATENT DOCUMENTS 1168933 10/1969 United Kingdom ................. 264/50

Primary Examiner—Philip Anderson
Attorney, Agent, or Firm—Cullen, Sloman, Cantor, Grauer, Scott & Rutherford

[57] ABSTRACT

A method and apparatus for making a twin-wall internally corrugated plastic structural part provided with a smooth, dense, solid, thin walled, non-cellular skin comprising injecting a thermoplastic or resin material into a pair of closed mold members which define a sealed cavity. A small amount of plastic material is initially injected into the cavity with the material impinging upon and being dispersed over the mold members thereby forming a generally continuous thin skin substantially the mold surfaces. Thereafter, successively and intermittently injecting an inert gas under pressure through one mold member during continued injection of the plastic material into the cavity thereby pressurizing the skin against the walls of the mold cavity and progressively commingling the inert gas under pressure and the inwardly flowing plastic material as both enter the cavity until the cavity is filled with an internal corrugated body integral with and bonded to the skin. Further steps include cooling the twin-wall internally corrugated structural part to permit the same to solidify as an integral unit and venting the mold cavity to atmosphere to relieve pressure from the corrugated plastic structural part. The intermittent injection of the inert gas introduces minute amounts of pressurized gas into the continuously injected plastic material.

22 Claims, 16 Drawing Figures

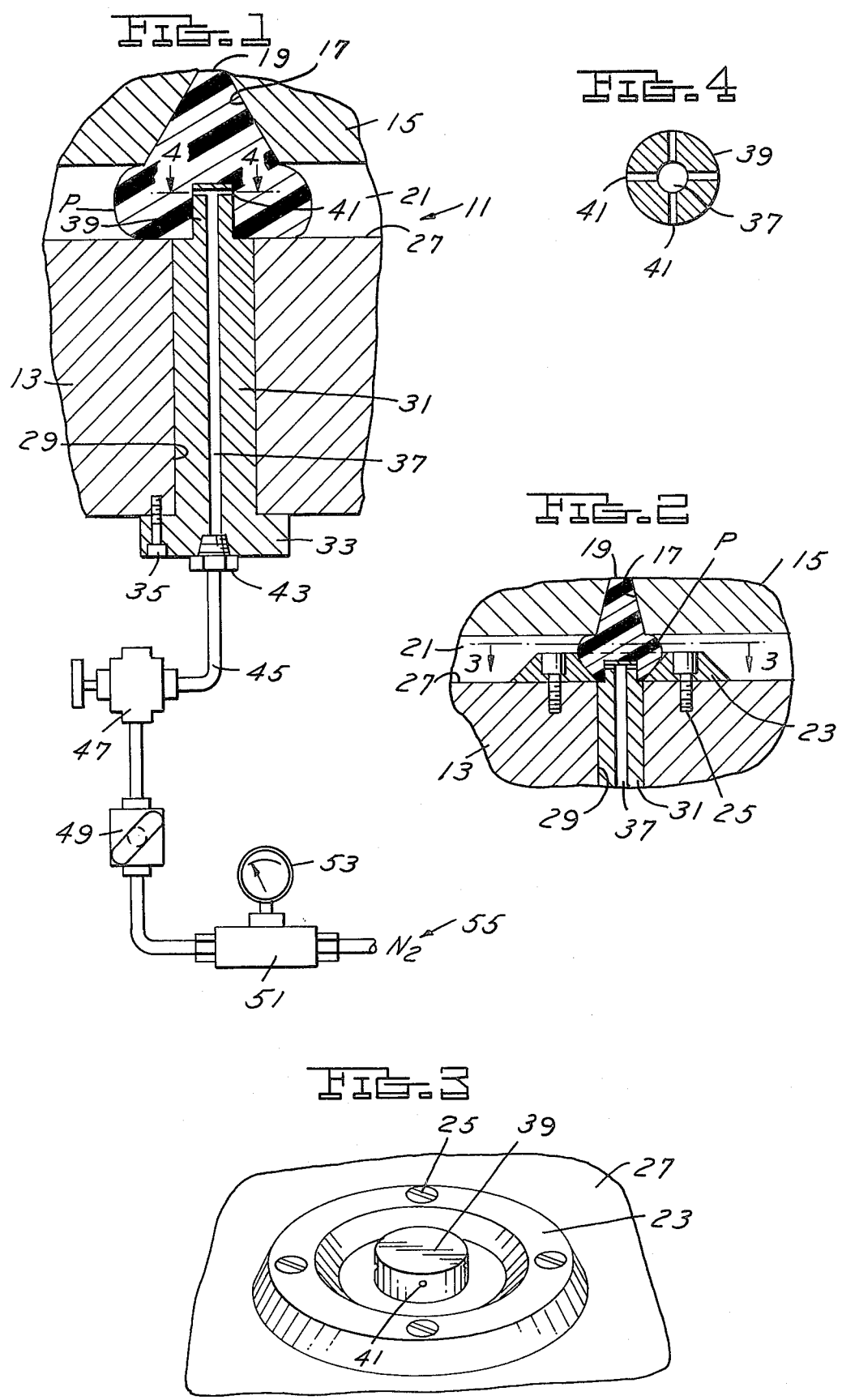

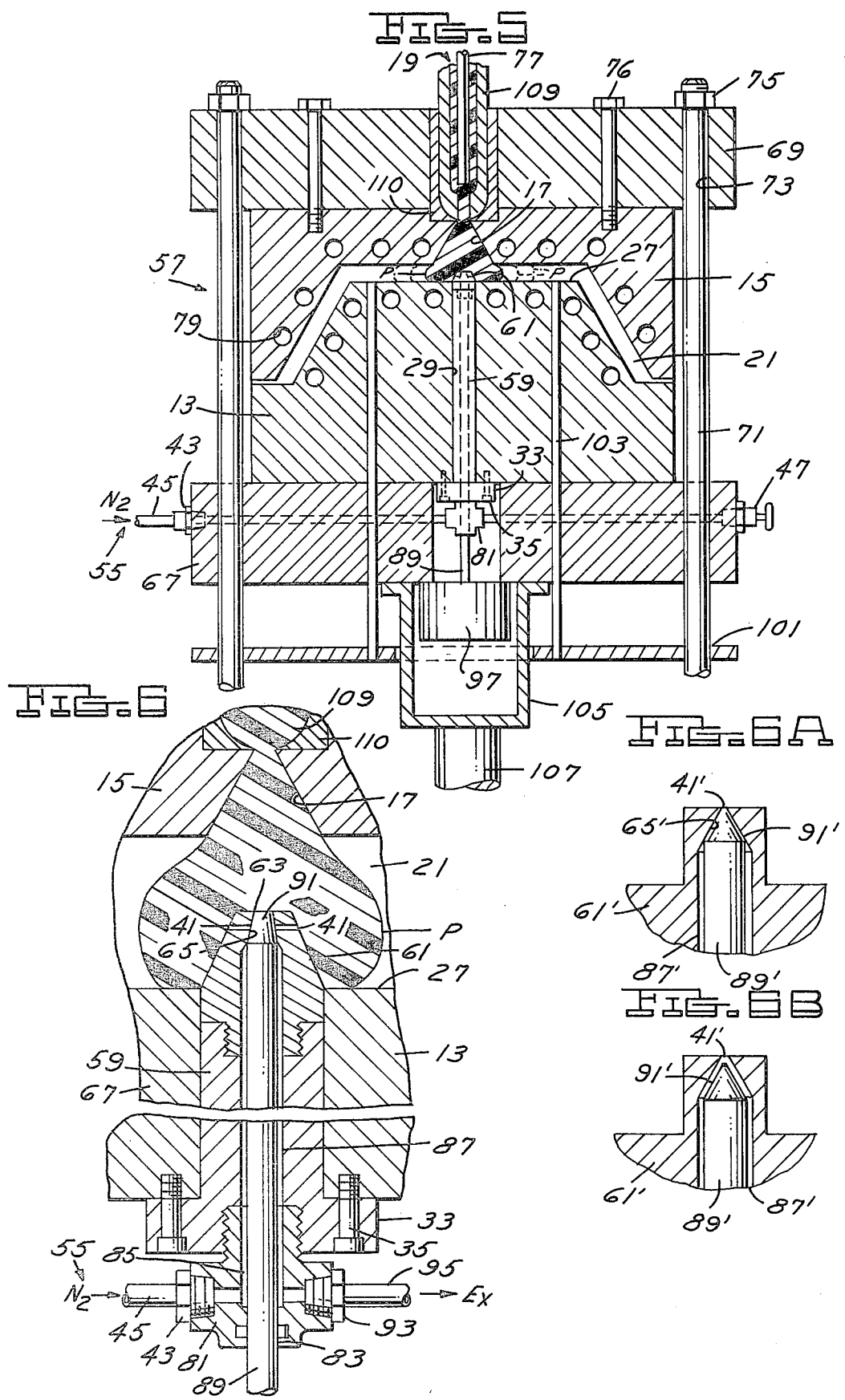

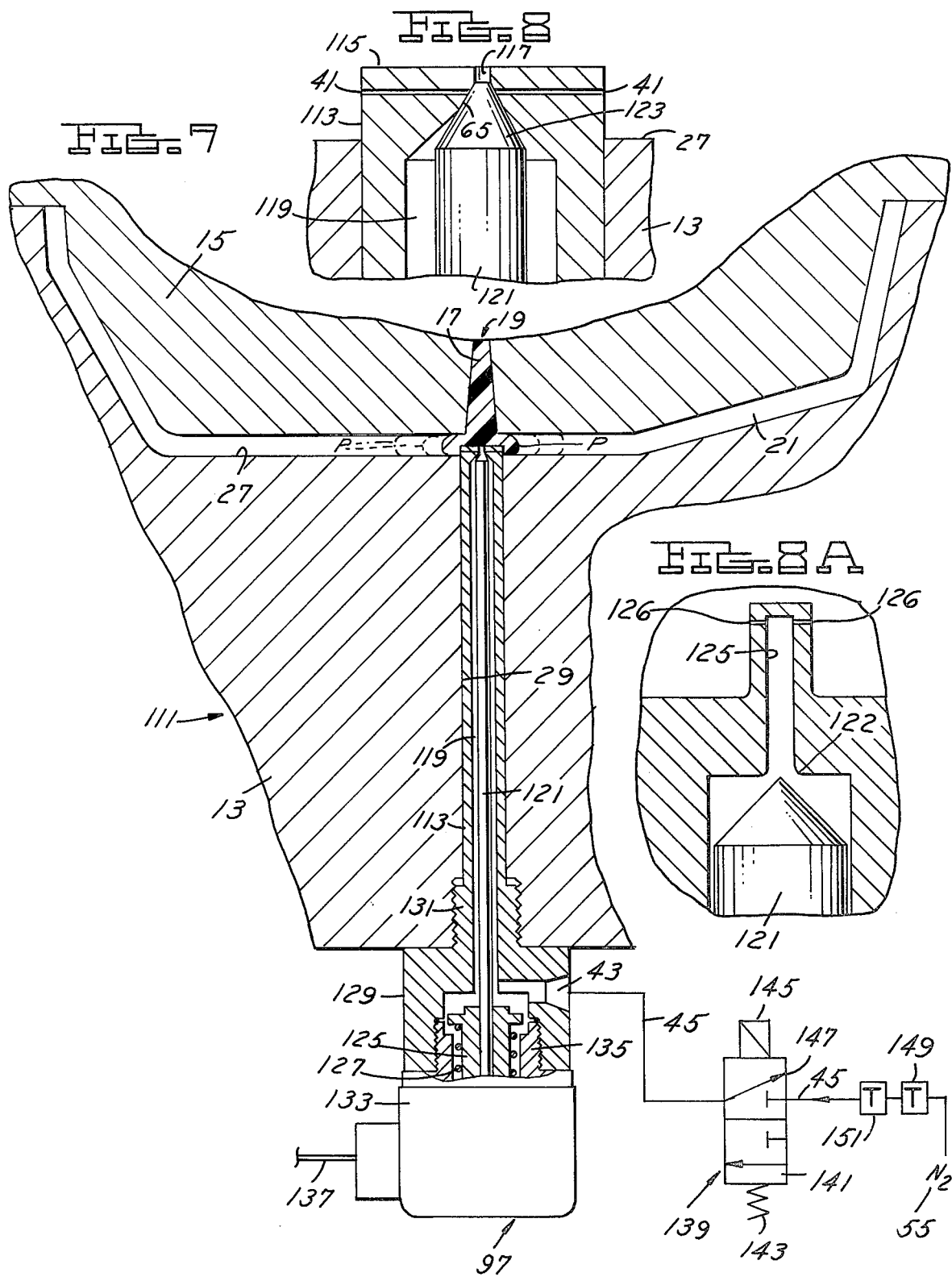

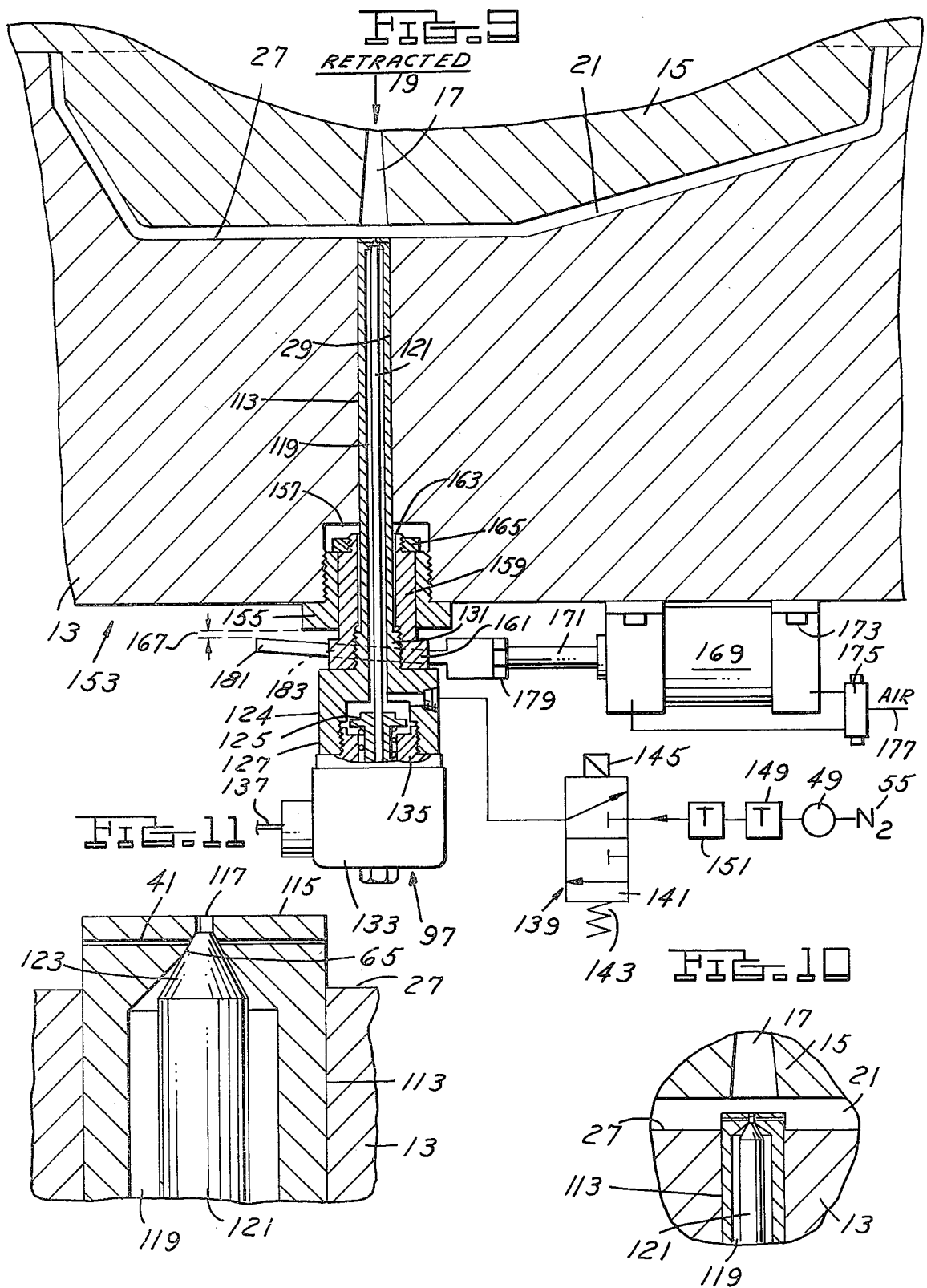

METHOD OF MAKING A TWIN-WALL INTERNALLY CORRUGATED PLASTIC STRUCTURAL PART WITH A SMOOTH NON-CELLULAR SKIN

BACKGROUND OF THE INVENTION

1. Field of Invention

In the art of injection plastic molding utilizing mold members defining a mold cavity moldable thermoplastic resin compositions or materials have heretofore been introduced into such molds for defining in the molded article a smooth non-cellular skin and an internal foam body. Various problems have arisen in providing a foam plastic structural part because of the need of finishing the exterior surface thereof to render the same smooth and non-porous. In the use of blowing agents heretofore and in the introduction of cellular plastic material into a mold, the resulting part does not have in many cases a smooth, dense, solid outer surface due to the passage of gaseous materials to the mold surfaces during the molding operation resulting in pitting and irregularities formed in the surfaces. Costly hand finishing of the part was often required.

2. Description of the Prior Art

Various unsuccessful attempts have been made heretofore to mold foam plastic structural parts having smooth skins or surfaces and to commercialize same in the industry. Typical of such efforts are the following United States patents along with prior art United States and foreign patents cited therein:

| U.S. Pat. No. | DATE | INVENTOR |
| --- | --- | --- |
| 4,136,220 | January 23, 1979 | Olagoke Olabisi |
| 4,140,672 | February 20, 1979 | Hiroshi Kataoka |
| 4,201,742 | May 6, 1980 | James W. Hendry |

BRIEF SUMMARY OF THE INVENTION

An important feature of the present invention is to provide a method for making a twin-wall, internally corrugated plastic structural part which has a smooth, dense, shiny, solid, fluid impermeable outer skin with the internal or interior portion of the part being of low density and having generally elongated hollow pockets or voids interconnected by smaller generally elongated narrow and closed slits or tails which together form the internal corrugations and provide structural strength to the part.

Another important feature is to provide a method of making a twin-wall, internally corrugated plastic structural part provided with a smooth non-cellular skin which comprises the steps of closing a mold within a suitable press having at least a pair of mold members which define a sealed cavity, injecting a small amount of thermoplastic resin composition, sometimes referred to as plastic material, through one of the mold members into the mold cavity for impingement upon and dispersion over the mold members thereby forming a generally continuous skin of predetermined thickness throughout and over the surfaces of the mold members. A further step includes thereafter injecting inert gas under pressure through one of the mold members during continued injection of the plastic material into the cavity thereby pressurizing the skin against the walls of the mold cavity and progressively introducing the gas into the inwardly flowing plastic as it enters the cavity until the cavity is filled with internal corrugations or a corrugated inner body integral with and bonded to the skin.

A further feature includes the step of injecting the pressurized gas intermittently thereby producing minute amounts of pressurized gas into the continuously injected plastic material.

A still further feature of the molding process includes the provision of injecting a small amount of heated plastic material into the mold cavity for forming with the subsequent introduction of an inert gas a thin skin over the surfaces of the mold members and injecting the inert gas under pressure, such as nitrogen, through one of the mold members during the continued injection of the plastic material into the mold cavity thereby pressurizing the skin against the walls of the mold cavity and progressively corrugating the inwardly flowing plastic material as it enters the cavity until the cavity is filled with an internal corrugated body integral with and bonded to the skin of the part formed.

Another feature is to provide in the process the step of cooling the mold members until the part is solidifed and venting the cavity to atmosphere to permit the escape of any pressure trapped in the mold cavity followed by the successive repeat of the cycle of method steps for producing a series of such molded articles or parts.

A further feature includes the intermittent introduction of pressurized gas into the mold cavity during injection of plastic material thereinto and wherein a valve mechanism or member is employed for controlling the intermittent flow of minute amounts of pressurized gas into the continuously injected plastic material, incorporating a pneumatic or electrically operated oscillator for intermittently opening and closing the valve member through a cycle of 4 to 100 cycles per second.

A still further feature includes the step of dispersing the pressurized gas through one orifice or through a plurality of angularly related orifices of small diameter in the range of 0.003–0.010 inches, approximately, wherein pressurized gas is dispersed through the one orifice or is dispersed through the angularly related orifices in a transverse plane laterally outward towards the interior walls of the mold members throughout 360°.

Another feature in the present method is to provide a probe having a head and employing one orifice or a series of laterally directed angularly related orifices therein delivering inert gas under pressure to the mold cavity, and with an oscillator valve member controlling the intermittent flow of pressurized gas into the mold cavity thereby introducing minute or small amounts of pressurized gas into the continuously injected plastic material.

A further feature incorporates into the method the step of advancing the probe and its head with one or more orifices a short distance into the mold cavity for introduction of the pressurized gas thereinto and for withdrawing the probe from the mold cavity after the molded part has been formed.

BRIEF DESCRIPTION OF THE DRAWINGS

FIG. 1 is a schematic fragmentary view of the basic mold apparatus with mechanism for intermittently directing pressurized inert gas into the mold cavity subsequent to the initial injection of plastic material thereinto and during continued injection of the plastic material and gas into the mold cavity.

FIG. 2 is a fragmentary section showing the mold members defining the mold cavity, corresponding to FIG. 1, illustrating the use of a fan gate upon one of the mold members.

FIG. 3 is a fragmentary plan view of a mold member on an increased scale taken in the direction of arrows 3—3 of FIG. 2.

FIG. 4 is a sectional view on an increased scale taken on the line 4—4 of FIG. 1.

FIG. 5 is a fragmentary elevational view of the mold members, as an example, as would be mounted upon a suitable press illustrating the injection of the plastic material into the mold cavity and the apparatus for intermittent injection of pressurized gas into the mold cavity.

FIG. 6 is a fragmentary sectional view on an increased scale of part of the apparatus shown in FIG. 5.

FIG. 6A is a fragmentary sectional view of a modified valve structure utilizing a single orifice and illustrated in a closed position.

FIG. 6B is a fragmentary sectional view of the modified valve structure of FIG. 6A but illustrated in an open position.

FIG. 7 is a fragmentary section of a pair of mold members defining a mold cavity and the illustration of a stationary probe having a plurality of orifices together with a power operated oscilltor assembly for intermittently opening and closing the orifices for delivering pressurized gas intermittently into the mold cavity during the injection of plasticized material.

FIG. 8 is a fragmentary sectional view on an enlarged scale of the head portion of the probe shown in FIG. 7.

FIG. 8A is a fragmentary sectional view of another modified valve structure which may be used with a stationary probe or with a retractable probe.

FIG. 9 is a fragmentary view of a modified mold apparatus utilizing a retractable probe with the probe shown in a retracted position.

FIG. 10 is a fragmentary sectional view corresponding to FIG. 9 illustrating the probe in an advanced position within the mold cavity.

FIG. 11 is a sectional view similar to FIG. 10 and illustrating the advanced probe and mold member on an enlarged scale.

It will be understood that the above drawings illustrate merely several preferred embodiments of the invention, that other embodiments illustrative of the present method and apparatus are contemplated within the scope of the claims hereafter set forth.

DETAILED DESCRIPTION OF AN EMBODIMENT OF THE INVENTION

Figure 12:
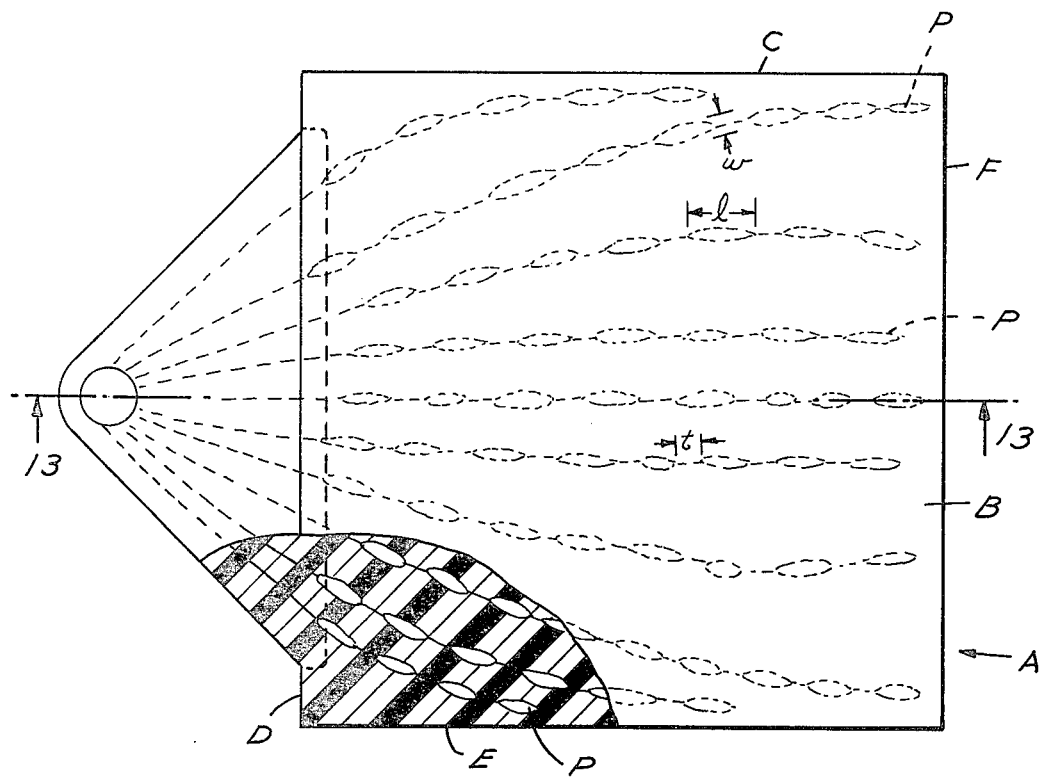
FIG. 12 is a fragmentary plan view of part of the apparatus and illustrating the twin-wall, internally corrugated plastic structural part made according to the novel method and apparatus.
Figure 13:
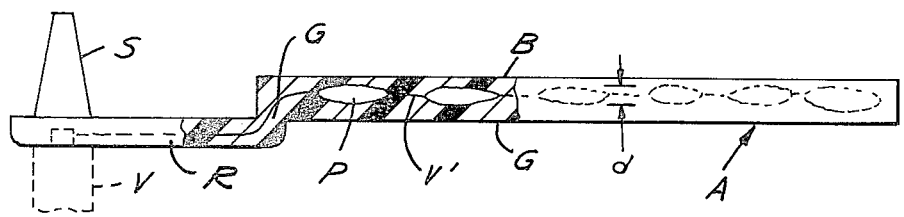
FIG. 13 is a sectional view taken on the line 13—13 of FIG. 12.

The twin-wall, internally corrugated plastic structural part A illustrated in FIGS. 12 and 13 is made in accordance with the teaching of this patent application by utilizing the novel methods and the novel appartuses disclosed herein.

Referring specifically to FIGS. 12 and 13, the part A removed from the mold, is in the form of a generally rectangular flat panel having an upper smooth, dense, shiny, solid, thin-walled non-cellular top or upper skin or surface B, side surfaces C, D, E & F and a bottom surface or skin G, all of which have physical characteristics like surface B. No painting or finishing is required after the part is formed thus providing much savings in labor, time and materials.

FIGS. 12 and 13 diagramatically illustrate a single manifold sprue S in one mold member, not shown, for introducing the plastic material and a gas valve V in the other mold member, not shown, for introducing intermittently the inert gas. The conventional runner R and gate G' are also diagramatically shown for use with the novel apparatus and for practicing the novel method.

The plastic structural part A when removed from the mold assembly or apparatus as noted herein has a smooth dense, shiny, solid, fluid impermeable outer skin, as represented by surfaces B, C, D, E, F and G which are bonded to the internal or interior portion, body or zone of the part. The interior body is characterized herein as an "internally corrugated" portion, body or zone. The term "foam" is not accurate to describe the internal portion, body or zone of part A. As illustrated in FIGS. 12 and 13, part A has many elongated hollow pockets or voids P of varying configurations and in generally the same plane as shown in FIG. 13, from which the pressure of gas has escaped, and which are arranged in varying but random corrugated patterns throughout the entire internal structure. The voids P are interconnected by smaller but also elongated narrow and generally closed slits or tails V', also in the same plane. The voids P and slits V' are at atmospheric pressure, having had the pressure of the gas vented prior to the setting of the solid plastic material which forms the plastic structural part A.

Thus the term "corrugated" or "corrugating" refers to the internal or interior zone or body of part A which has a series of randomly spaced but interconnected voids or pockets P and to the closed slits or tails V' from which the gas has been removed. The interior zone has a low density due to the pockets P and tails V'.

The elongated voids or pockets P have a preferred length "l" of approximately ½ inch, a predefined width "w" of approximately 3/16 inch and a preferred depth "d" of approximately 3/16 inch. The preferred length "t" of each tail "v" is approximately ¼ inch. The total volume of the voids or pockets P and the tails V' is the range of 10% to 25% of the total volume of the molded structural part. The spacing and size of the voids P and tails v' and therefore the density of the part is dependent on the rate of delivery of the gas under pressure. It has been determined that the faster the inert gas is introduced the smaller are the size of volume of the pockets P and the closer the pockets P are together. Structural parts, produced according to the teachings of this application, when cut in half, display the "corrugated" portion, body, or zone which is generally similar in appearance to a two ply corrugated cardboard structure.

Referring to the drawings, FIGS. 1 through 4, a simplified form of molding apparatus is generally designated at 11 including a movable mold member 13 and a stationary mold member 15 fragmentarily shown. Mold member 15 has a sprue or bore 17 adapted to receive at 19 any thermoplastic resin composition, hereafter referred to as plastic material, for injection into the sealed mold cavity 21 defined by the mold members 13 and 15. The mold member 13 has centrally thereof and concentric of the probe 31 an annular fan gate 23 secured to mold face 27 by a series of fasteners 25, FIGS. 2 and 3. The use of the fan gate 23 is optional and is not necessary in practicing the novel method or in using the novel apparatus. Therefore the fan gate 23 is illustrated in FIGS. 2 and 3 but not in FIG. 1.

Within mold member 13 there is a radial bore 29 within which is nested the elongated probe 31 having a mount flange 33 secured to the mold member 13 by fasteners 35. The probe 31 has an axial fluid passage or bore 37 for receiving an inert pressurized gas, such as nitrogen in the pressure range of 300 to 1500 psi. The pressure range of the inert gas when introduced into Norel Styrene A.B.S. is 400 to 600 psi. Other inert gases which might be used are argon or helium. Their composition must render them inert to the injected thermoplastic resin composition introduced as a fluid or molten plastic at or through the sprue 19, FIG. 1. It will be appreciated that the pressure of the inert gas is higher than the pressure at which the plastic material is introduced in the mold cavity.

Probe 31 at one end has a head 39 of reduced diameter relative to the probe closing the passage 37 and having formed therein a series of right angularly related or radial orifices 41. These are located at a central zone with respect to cavity 21, FIG. 1, 2 and 3. The orifices 41 are small, in the range of 0.003 to 0.010 inches, for laterally dispersing upon the interior of the mold cavity 21 in a transverse plane minute quantities of inert pressurized gas during the molding process. It will be appreciated that instead of using a plurality of orifices or holes 41, a single axially extending orifice or hole in line with the injection sprue 17 could be used. Thus a single orifice, as in FIGS. 6 A and 6 B, would be at the end of and straight up from passage 37 as viewed in FIG. 1 along with an appropriate fan gate or gating structure not shown.

Fitting 43 upon the outer end of probe 31 is connected to a fluid pipe or conduit 45 having a normally closed hand operated vent valve 47 and spaced therefrom a manually operable hand valve 49 with a gauge assembly 51, 53 designating the pressure of inert gas such as nitrogen from pressurized gas source 55 as schematically shown.

While the method steps will be hereunder set forth in greater detail, FIGS. 1 through 4 illustrate an apparatus by which the method could be carried out. Subsequent to the injection of plastic material at the sprue 19 into the closed mold cavity 21 for forming a skin upon the interior of the mold cavity 21, there is introduced into the mold cavity a stream of pressurized gas through the orifices 41 applying uniform pressure to the plastic skin formed upon the interior of the mold cavity 21 and for producing an internal or interior corrugated zone or body with the inwardly fed plastic material until the mold cavity 21 is filled therewith. With the method and apparatus the probe 31 or head 39 is encapsulated or swallowed by the plastic material at the beginning of the shot as represented by the puddle of plastic P in FIG. 1 and elsewhere in the application. In the operation defined illustrated FIG. 1, the manual valve 49 provides a means by which pressurized gas can be intermittently injected into the mold cavity 21 until the plastic material injected thereinto through the sprue 19 has formed the corrugated core for the molded part or product. In the molding process, after the pressurized gas supply is turned off by the valve 49, the valve 47 is manually opened to vent the mold cavity 21 and the molded part to atmosphere for relieving entrapped gases therein. It should be appreciated from reviewing the above described method steps that a small amount of plastic is first introduced into the mold cavity followed by jointly (a) continuing the introduction of the plastic material, and (b) either continuously or intermittently introducing pressurized gas to form the corrugated zone or body of the twin-wall internally corrugated plastic structural part.

FIRST MODIFICATION

A more sophisticated molding apparatus is designated by the numeral 57 in FIGS. 5 and 6 which includes movable mold member 13 and stationary mold member 15 defining therebetween, when closed, a sealed molding cavity 21 the same as above described with respect to FIG. 1. One of the mold members 13 has a mold face 27 corresponding to FIG. 1 and a corresponding transverse bore 29 which receives the probe 59, whose mount flange 33 is secured to mold member 13 by fasteners 35. A fan gate, not shown, could be used with the appartus of FIGS. 5 and 6 although it is not required and is therefore optional.

Probe 59 at one end has a tapered head 61 having a fluid outlet 63. Alternately or in addition to the outlet 63 are a plurality or series of radially directed right angularly related orifices 41, such as shown in FIG. 4, for delivering pressurized gas into the mold cavity 21. The plurality of orifices 41 may be located to extend upwardly rather than radially when viewed in FIGS. 5 and 6.

A tapered seat 65 is formed within head 61 normally in registry with the orifices 41. It should be understood that other configurations of valve heads and valve seats may be used in place of the tapered configurations illustrated in FIGS. 5 and 6. As an example, a pointed end may be provided on the valve head which cooperates with a flat valve seat of the type shown in FIGS. 7-11 inclusive. Mold member 13 is mounted upon and secured to travel plate or movable platen 67, FIG. 5 forming a part of a conventional vertical or horizontal press. Mold member 15 underlies and is secured to the fixed support plate or platen 69, FIG. 5 by the fasteners 76. Guide rods 71 are secured as at 75 to the fixed support plate 69 and guidably extend through the travel plate 67. Plate 67 has a central support 105 and a clamp actuator 107 of a conventional construction, by which mold member 13 is brought into snug sealing registry with mold member 15 and clamped together thereby defining the sealing mold cavity Fragmentarily shown in FIG. 5 is the nozzle 109 for the plastic material 19 to be injected into cavity 21. The nozzle 109 is in cooperative registry with sprue bushing 110 coaxial of sprue bore 17 within mold member 15. A reciprocal material shut off pin 77, is fragmentarily shown as axially disposed within nozzle 109; and in the position shown is blocking off the flow of plastic material 19 to the sprue 17. However, when the pin 77 is opened the head 61 is swallowed or encapsulated at the beginning of the shot as represented by the plastic puddle P in FIGS. 5 and 6.

A plurality of interconnected holes or water or cooling channels 79 are formed through the respective mold members 13 and 15 and are adapted to receive cooling fluid for use during the cooling cycle of the method and after the molding of the article within the mold cavity 21. Cooling fluids may be employed such as chilled water, carbon dioxide, Freon or other cooling fluids as is known in the art.

The mold members 13 and 15 are not normally preheated and are operated at temperatures between 50° F. to 100° F. except where polycarbonate material is utilized. In such a case the mold temperature is approximately 190° F. to 240° F. The temperature of the mold members corresponds to the temperature used in injection molding.

Nested within the travel plate or platen 67 centrally thereof is a fitting 81 which has a bore 83, FIG. 6 to guidably receive the oscillating valve rod 89. The rod 89 at one end has, as an example, a tapered valve element 91 seated in FIG. 6 with respect to the tapered seat 65 within the probe head 61 normally closing off the orifices 41 in communication with mold cavity 21.

The fitting 81 has a counterbore 85 which is in communication with the fluid chamber or passage 87 which extends axially of the probe 59. The conduit 45 is connected to a source of pressurized gas such as nitrogen at 55 as shown in FIGS. 1 and 5 and includes a fitting member 43 which is connected to fitting 81 for delivering pressurized gas into the counterbore 85 of the fitting 81 and into the communicating passage or fluid chamber 87.

Vent pipe or conduit 95 normally communicating with atmosphere and through some form of vent valve means such as shown at 47, FIG. 5, is adapted for venting the passages 85, 87 at the completion of the molding of the twin-wall, internally corrugated plastic structural part in order to permit the escape of pressurized gas entrapped within mold cavity 21 or within the hollow pockets, voids and slits of the molded part, as will be explained in connection with FIGS. 12 and 13. This would occur, however, when the valve rod 89 is intermittently retracted from the position shown in FIG. 6 so that there is communication between the passage 87 and the single orifice 63 or the series of orifices 41 to the interior of the mold cavity 21.

In the present method and as shown in FIGS. 5 and 6, pressurized gas from source 55, conduit 45 and fitting 81 to the passages 85 and 87 is intermittently directed through the orifices 41, under the control of the oscillatable valve rod 89 connected to the oscillator 97. The oscillator 97 has a reciprocal element which is secured to the valve rod 89 by which the valve rod 89 is reciprocated during molding in a plurality of cycles such as four to one hundred cycles per second approximately. In the molding process, and during the introduction of plastic material within the mold cavity 21, minute amounts of pressurized gas are intermittently or continuously injected into the plastic material to form the internal corrugated zone or body of the part.

The present oscillator valve assembly, as one example, is available on the market and may be purchased from Atkomatic Valve Company, Inc., located at 141 South Sherman Drive, Indianapolis, Ind. 46201. Specifically an Atkomatic 12000 serves, high pressure bronze solenoid valve which operates up to 3,000 psi may be used.

The oscillator 97 may be electrically, pneumatically or even hydraulically operated with its primary function of effecting a plurality of oscillations or intermittent movements of the valve rod 89 for opening and closing the orifices 41 in an intermittent manner during the molding process.

FIGS. 6 A and 6 B show a modified probe 61' having a bore or passage 87' with an orifice 41' at the outer extremity of same of a size in the range of 0.003 to 0.010 inch. A modified valve rod or member 89' has a pointed or tapered valve element 91' which is seated in FIG. 6 A with respect to the tapered seat 65' within the probe head 61' to close orifice 41' from communication with the mold cavity.

When the valve member 89' is oscillated to open, the tapered valve element 91' is moved away from the orifice 41' as shown in FIG. 6 B to permit the inert gas in passage 87', located in the modified probe 61' and surrounding the valve member 89', to be injected into the mold cavity through the orifice 41'. Therefore in certain application a single axialy located orfice may be used along or in combination with a plurality of angularily related orifices as explained previously. It should be appreciated that a suitable fan gate or gating structure will be employed with the modified valve structure of FIGS. 6A and 6B.

The flow rate of the plastic material is tailored to the number of pumps or cycles required to inject it into the mold cavity 21. In addition the relationship between the speed or rate of injection of the plastic material and the rate of injection of the inert gas is important to insure that the inert gas does not out distance the flow of the plastic material in the cavity. The plastic material has to flow faster than the inert gas which in the apparatus and during the method is helping, assisting and is thereby urging the plastic material to the extremities of the mold cavity 21 to completely fill it. As noted previously the inert gas is introduced with the plastic material to form the corrugated body or zone of the structural part either preferably intermittently or continuously for some limited applications where structural strength of the molded part is not critical.

SECOND MODIFICATION

A more sophisticated embodiment of the present invention is illustrated by the mold apparatus 111, FIGS. 7 and 8, incorporating a stationary probe 113 corresponding to the stationary probe 59 of FIGS. 5 and 6.

Without repeating in detail the construction of the mold apparatus, there is included the mold members 13 and 15, fragmentarily shown, which when sealed together closed as in FIG. 7 define the mold cavity 21. As above described, the sprue or bore 17 of the mold member 15 has injected thereinto as at 19, the preheated moldable thermo plastic resin composition material hereafter referred to as plastic material. No fan gate is employed in the mold cavity 21 although one could be used as explained previously.

Probe 113 has a head 115 which projects beyond the mold face 27 so that the single orifice 117 therein is centrally disposed substantially within the cavity 21 for the purpose of intermittently injecting the pressurized inert gas into the mold cavity 21. Also, and as an optional feature as shown in FIG. 8, head 115 may employ the axial outlet or orifice 117 through which some pressurized gas may be delivered to the mold cavity 21 in conjunction with the series of radially directed orifices 41, when the valve rod 121 has been retracted from the position shown in FIGS. 7 and 8.

The valve rod 121 has a tapered valve element 123 upon one end adapted for cooperative sealing registry with the tapered valve seat 65 for normally closing off the orifices 41 and aperture 117.

The oscillator assembly 97 includes an oscillator 125, FIG. 7, which is normally spring biased outwardly as by the coiled spring 127 normally maintaining the valve rod 121 and the valve element 123 seated with respect to orifices 41, FIG. 8.

Probe 113 has a base 129 and an axial threaded shank 131 which is threaded into mold member 13. Oscillator body 133 has an axial threaded boss 135 which is threaded up into probe base 129 for securing the oscillator assembly 97 with respect to mold member 13.

The oscillator assembly 97 may be pneumatic, electrically or hydraulically operated as schematically shown by the element 137. Upon energization thereof the oscillator 125 will reciprocate causing a simultaneous intermittent reciprocal movement of the valve rod 121 for opening and closing the orifices 41 in the probe head 115.

In the mold apparatus 111, FIG. 7, there is shown a conventional fluid control valve 139 which in the normally closed position of its valve spool 141 under the action of spring 143 vents to atmosphere as at the port 147. Energization of the solenoid 145 will move the valve spool 141 to its active position for directing the flow of pressurized gas through the conduit 45 to the fitting 43 for communication with fluid or gas chamber 119. Interposed in the conduit 45 connected to the source of pressurized nitrogen or inert gas 55, FIG. 7, is a normally open gas delay timer 149. Also applied to the conduit 45 in communication therewith is the normally open gas injection timer 151.

In practicing the present method initially, the plastic material is injected as at 19 into the sprue 17 of mold member 15 for injection into the mold cavity 21 for impinging upon and dispersion over the mold members 13, 15 to thereby form a generally continuous skin of a predetermined relatively thin thickness throughout and over the surfaces of the mold members 13 and 15. The gas delay timer 149 times out admitting the flow of gas through the conduit 45 and at the same time the normally open gas injection timer 151 is activated for a predetermined interval for thereafter shutting off the flow of pressurized gas into chamber 119 and successively into the mold cavity 21.

The timing out of the gas injection timer 151 corresponds to the time necessary for the plastic material injected at sprue 17 to fill the mold cavity. The initial introduction of the pressurized gas assist in the formation of the skin upon the molded part by urging the plastic material against the walls of the mold cavity. Successively thereafter during the intermittent injection of the pressurized gas and the continuous injection of plastic material into the mold cavity, there is a commingling of the plastic material with the pressurized gas as both plastic and gas are injected into the mold cavity 21, progressively forming the internal corrugated zone or body of the molded part which is integral with and bonded to the skin.

Thus, the gas injection timer 151 is preset to permit the continued flow of pressurized gas intermittently under the control of the oscillator assembly 97 until the cavity 21 has been filled with plastic material completing the formation of the molded part. Subsequently, as a part of the molding process the molded part is cooled in the manner above described. After the mold part has become solidified, a further step is the venting of the mold cavity 21 by activating the oscillator and reciprocating the valve rod 121.

At the moment that the cavity 21, has been filled with plastic material completing the formation of the molded part, the flow of plastic material into the mold is interrupted. Simultaneously the flow of pressurized gas is stopped. The solenoid 145 of the control valve 139 is held open to allow pressure to stay in the cavity 21 for a period of time to permit the plastic to set up and to prevent collapse of the twin-wall corrugated plastic structural part. The gas pressure is held on for thirty to sixty seconds. After the expiration of the time the spring means 143 moves the valve spool 145 to the position shown in FIG. 7 venting the passage 119 to atmosphere. Subsequently thereto, the valve rod 121 is intermittently retracted for a short period to permit venting of the mold cavity 21 to atmosphere through the control valve 139. This is for the purpose of permitting the escape of entrapped pressurized gas within the mold cavity 21 and within the molded part. The valve rod 121 is returned to the position shown in FIGS. 7 and 8 closing off the orifices. At that time in a conventional operation of the press, the mold member 13, FIG. 7 is retracted with respect to the mold member 15 utilizing the actuator 107, FIG. 5. Simultaneously the ejector bar 101 and the connected ejector pins 103 are advanced patly into the cavity 21 for separating the molded twin-wall corrugated structured part from the mold members 13, 15 and for removal from the mold so that the molding cycle can be repeated in an automatic manner.

FIG. 8 A shows a modified single valve and valve seat construction. The valve element 121' is adapted to seat against a curved or rounded valve seat 122 to stop the flow of gas. It is intermittently opened like the other probes previously described and permits gas to enter the slotted pocket or opening 124 which leads to a plurality of orifices 126 located in the probe head. Gas enters the mold cavity through the orifices 126.

THIRD MODIFICATION

The modified mold apparatus 153 which includes a retractable probe 113 is shown in FIGS. 9, 10 and 11, and without repetition includes much of the structure above described with respect to FIGS. 7 and 8.

The function and operation of the reciprocal valve rod 121 in probe 113 is nevertheless under the control of the oscillator assembly 97. The oscillator 125 is normally spring biased to the position shown in FIG. 7 and is connected to the valve element 121 for effecting a series of oscillations for opening and closing the valve element 123 for intermittently directing pressurized inert gas, such as nitrogen, into the mold chamber 21 during the injection thereinto of plastic material for forming a molded structural part within cavity 21.

In the mold apparatus 153, there has been added thereto the function and apparatus by which the probe 113 is retractable such as to the position shown in FIG. 9 before the molding step. During molding the probe 113 will be advanced to the position shown in FIG. 10 with the orifices 41 exposed for lateral dispersion of minute quantities of pressurized gas intermittently into the mold cavity 21. To the extent that the mold apparatus 153 corresponds in structure to the mold apparatus 111, FIG. 7, the detail of this construction is not repeated.

Additionally, the mold apparatus 153 provides a means by which the probe assembly, to which is connected the oscillator 97, is fed alternately inwardly and outwardly. Bushing 155 underlies the mold member 13 and is threaded into a corresponding bore 157. Reciprocal slide 159 has a head 161 at one end and at its opposite end a threaded shank 163 which extends into bore 157 and has secured thereover stop nut or support nut 165. The nut 165 is in registry with bushing 155 for limiting downward movement of the slide 159.

Shoulder 161 in the retracted position is normally spaced from bushing 155 a distance of ⅛ of an inch, approximately, which corresponds to the amount of in and out movement 167, shown in FIG. 9, of the slide 159 which is axially connected to the probe 113 for movement in unison.

For the purpose of effecting the intermittent movements of the slide 159 mounting the probe 113 there is provided a power operated conventional cylinder assembly 169, schematicaly shown, having a reciprocal piston rod 171, and secured to the undersurface of the mold member 13 as by fasteners 173.

Control valve 175 in a conventional manner is connected to a source of pressurized air; and a pair of conduits are connected to opposite ends of the cylinder assembly 169 for effecting reciprocal movements of the piston rod 171 as desired. Piston rod 171 at one end is connected to the clevis 179 from which projects one or a pair of elongated cam bars 181 which are inclined upwardly at an acute angle and which extend through corresponding cam slots 183 formed within the slide 159.

Accordingly, forward movement of the piston rod 171 causes the slide 159 and the connected valve rod 119 to retract such as to the position shown in FIG. 9. When the piston rod 171 is retracted, under the control of the valve 175, the probe head 115 on the probe body 113 will be elevated such as to the position shown in FIGS. 10 and 11. Here the orifices 41 and outlet 117 are in communication with the interior of the mold cavity 21 centrally thereof.

While the valve rod 121 is intermittently reciprocated by the oscillator assembly 97 resulting in a large number of oscillations during the period of forming the molded plastic corrugated product or part, the cylinder assembly 169 will only be activated at the beginning of the molding cycle and retracted at the end of the molding cycle. Thus, the reciprocation of the piston rod 171 is slow compared to the oscillations of the valve rod 121 in the range of between 4 and 100 cycles per second.

OPERATION OF THE STATIONARY PROBE, FIG. 7

The following method steps are involved in the present process utilizing the apparatus shown in FIGS. 7 and 8.

1. The mold is closed by bringing together mold members 13 and 15 to define the sealed molding cavity 21 utilizing the conventional apparatus shown in FIG. 5.

2. Open the fluid controlled valve 139 by energizing solenoid 145 so that pressurized gas from the source 55 is directed through the normally open timers 149 and 151 into the probe chamber 119 at a preselected pressure such as would be designated by the gauge shown at 51–53, FIG. 1.

3. Start injecting plastic material at 19 through the sprue 17 within mold member 15, FIG. 7 and simultaneously start the gas delay timer 149.

4. This initial introduction of a little or small amount of plastic material injected into the mold cavity 21 causes it to impinge upon and be dispersed over the mold members and the surfaces thereof defining the cavity 21 thereby forming a generally continuous skin of predetermined thickness throughout and over the surfaces of the mold members. Almost simultaneously but after the small amount of plastic has been introduced and after the gas delay timer 149 times out, the oscillator 97 is energized causing the valve rod 121 to oscillate rapidly for opening and closing the orifice 117, FIG. 8. Oscillation is controlled electronically at a rate of between 4 to 100 cycles per second.

5. Simultaneously, with the proceeding step, the gas injection timer 151 is started.

6. When the gas injection timer 151 times out, the oscillator 97 is deactivated to stop oscillation of the valve rod 121. At the same time, the solenoid of the fluid control valve 139 is held open to allow the pressure of the gas to stay in the cavity 21 for thirty to sixty seconds to permit the plastic to set and to thereby prevent the collapse of the corrugated molded part. After the time has expired, the spring 143 automatically moves the valve spool 141 therein to the position shown in FIG. 7 venting the pressurized gas. At the same time chamber 119 is vented to atmosphere as at port 147. During the period that the chamber 119 is vented to atmosphere, the valve rod 121 is intermittently retracted unseating the valve element 123 with respect to the valve seat 65, FIG. 8 in order to vent the cavity 21 and the molded corrugated part therein letting or permitting the entrapped pressurized gas escape to atmosphere through port 147.

7. After complete venting, rod 121 is biased to the closed position shown in FIGS. 7 and 8.

A conventional step that is now required is such sufficient cooling of the mold members as to assure that the molded part has congealed and is sufficiently solid, after which the mold members are separated in a conventional manner and the molded part ejected therefrom.

OPERATION OF RETRACTABLE PROBE, FIG. 9

The molding steps involving the retractable probe 113 is similar in many respects to the above steps of operation defined with respect to the stationary probe. These process steps are as follows:

1. Close the mold members 13 and 15 defining the sealed cavity 21 therebetween in a convention manner.

2. Probe 113 and the connected head 115 are advanced from the position shown in FIG. 9 to the position shown in FIG. 11. This is accomplished by retracting the piston rod 171 from the position shown in FIG. 9 causing an upward movement of the slide 159 limited by the stop shoulder 161 with respect to the bushing 155. This advanced position is shown in FIG. 11 with the orifices 41 in communication with the mold cavity 21, FIG. 9.

3. Open the gas control valve 49 to pressurize the probe chamber 119 with pressurized gas at a preselected pressure.

4. Start injecting plastic material at 19 through the sprue 17 and simultaneously start the gas delay timer 149. This means that at the beginning of the molding cycle, the initially injected plastic material is injected in the mold cavity 21 and impinges upon and is dispersed over the mold members 13, 15 thereby forming a generally continuous skin of predetermined relatively thin thickness throughout and over the surfaces of the mold members.

5. While the plastic material is continuing to be injected into the mold cavity 21, the gas delay timer 149 times out as preset and the oscillator 97 is activated and rapidly opens and closes the orifice 117 under the control of the oscillator operated valve rod 121. The oscillator is controlled electronically at a rate of 4 to 100 cycles per second. Simultaneously with the proceeding step for starting the injecting of plastic material, the gas injection timer 151 is started. This timer 151 is set for a period which corresponds to the time needed for the mold cavity 21 to be filled with the foamed material achieved by the intermixing of the continuously fed plastic material with respect to the intermittently dispersed pressurized inert or nitrogen gas within the mold cavity 21.

6. The alternate injecting of inert gas under pressure during the continued injection of the plastic material into the cavity 21 first pressurizes the plastic skin theretofore formed against the walls of the mold cavity and progressively corrugates the inwardly flowing plastic material as it enters the cavity until the cavity 21 is filled with a corrugated body or zone integral with and bonded to the smooth outer skin.

7. When the gas timer 151 times out, the oscillator 97 is deenergized stopping oscillation of the valve rod 121. The fluid control valve 139 is held open to allow the pressure of the gas to remain in the cavity 21 for thirty to sixty seconds to permit the plastic to set and to thereby prevent the collapse of the twin-wall corrugated molded part. After the time has expired the solenoid 145 is deenergized and shuts off further supply of pressurized gas to the chamber 119 and at the same time vents the gas within the chamber 119 to atmosphere as at port 147. At this time, valve rod 121 is retracted a short distance under the control of the oscillator 97 so that mold cavity 21 and the molded part therein is vented to atmosphere drawing entrapped gas from the cavity 21 and from the molded part or article.

8. After completing venting, the rod 121 is automatically closed such as to the position shown in FIG. 11.

9. Probe 113 is retracted unde the action of the cylinder assembly 169 which allows or permits the plastic material to seal the hole in the part left by the retracted probe. The successive conventional steps include the cooling of the mold members 13, 15 in order that the molded part be solidified. Thereafter one mold member is retracted and the molded part ejected in a conventional manner so that the apparatus is ready for a repeat cycle.

It should be appreciated that a plurality of gas injecting probes may be used to inject gas under pressure into the mold cavity or cavities. One gas probe is used with each plastic injection sprue. The probe and sprue are normally mounted in the mold assembly in opposed relationship as illustrated in the drawings. The teachings of this application may be applied to multiple sprues and multiple gas probes used in a single mold cavity or in multiple mold cavities as is known in the art.

Having described my invention, reference should now be had to the following claims:

I claim:

1. The method of making a twin-wall, internally corrugated plastic structural part provided with a smooth non-cellular sking comprising the steps of:

providing a mold having at least a pair of mold members defining a sealed mold cavity when the mold is closed;

locating in a mold member a probe having a head within the interior of and spaced from the walls of the mold cavity;

the probe and head having a passage for an inert pressurized gas, with the passage in the head terminating in one or more orifices which communicate with the mold cavity;

injecting a small amount of plastic material through a sprue in a mold member into the mold cavity to surround and to encapsulate the probe head;

thereafter injecting an inert gas under pressure through the probe after the initial injection of the small amount of the plastic material into the cavity thereby pressurizing and urging the plastic material against the walls of said mold cavity and forming a generally continuous thin skin of predetermined thickness; and thereafter injecting more inert gas under pressure through said probe into the cavity while injecting additional plastic material into the cavity thereby commingling the inert gas under pressure with the inwardly flowing plstic material as both enter the mold cavity, until the cavity and skin are filled with an internal corrugated body integral with and bonded to said skin.

2. In the method of claim 1, including the steps of injecting the plastic material through one of the mold members and locating the probe for injecting the inert gas in the other mold member, whereby the pressurized gas is commingled with the opposed inwardly flowing plastic material as it enters the mold cavity.

3. In the method of claim 2, including the step of dispersing the inert gas through at least one orifice located in the head of the probe, with the orifice having a diameter of 0.003 to 0.010 inches, approximately.

4. In the method of claim 3, including the step of dispersing the inert gas through a single orifice located axially in line with the passage in the probe.

5. In the method of claim 1, including the step of uniformly dispersing the inert gas from the orifices in the probe head into the mold cavity in a transverse plane laterally outward towards the walls of the mold members throughout 360°.

6. In the method of claim 2, including the steps of cooling the plastic structural part to permit same to solidify as an integral unit;

and venting the mold cavity to atmosphere to relieve pressure of the gas from the plastic structural part.

7. In the method of claim 3, including the step of dispersing the gas through a plurality of angularly related orifices provided in the probe head, each orifice having a diameter of 0.003 to 0.010 inches, approximately.

8. In the method of claim 1, including the step of alternately opening and closing the robe passage and orifices thereby injecting pressurized gas intermittently into the continuously injected plastic material.

9. In the method of claim 8, the further step of opening and closing the probe passage and orifices in the range of 4 to 100 cycles per second.

10. In the method of claim 1, in which said mold members include a top part having one or more sprues for introducing the plastic material, and a bottom part in which the probe is located for delivering the inert gas to the mold cavity.

11. The method of making a twin-wall, internally corrugated plastic part with a smooth, dense, shiny, solid, thin walled non-cellular skin comprising the steps of:

closing a mold having top and bottom mold members defining a sealed mold cavity;

locating in the bottom mold member a probe with an extended position said probe having a head in the interior of and being spaced from the walls of the mold cavity;

the probe and head having a passage for an inert pressurized gas, with the passage in the head terminating in one or more orifices which communicate with the mold cavity when the probe is in its extended position;

injecting a small amount of a plastic or resinous material through a sprue in the top mold member into the mold cavity to surround and encapsulate the probe head;

thereafter injecting an inert gas under pressure through the extended probe in the bottom mold member to pressurize and urge the plastic material against the walls of the mold cavity and form a generally continuous thin skin; and thereafter injecting more inert gas through the extended probe into the cavity while injecting additional plastic material into the cavity thereby commingling the inert gas under pressure with the opposed inwardly flowing plastic material as both enter the mold cavity, until the cavity and skin are filled with an internal corrugated body integral with and bonded to said skin.

12. In the method of claim 11, including the step of uniformly dispersing the gas from the orifices in the probe head into the mold cavity in a transverse plane laterally outward towards the walls of the mold members throughout 360°.

13. In the method of claim 12, including the step of dispersing the gas through a plurality of angularly related orifices provided in the probe head, each having a diameter in the range of 0.003 to 0.010 inches, approximately.

14. In the method of claim 11, including the step of injecting the gas intermittently through the probe and orifices thereby feeding minute amounts of pressurized gas into the continuously injected plastic material.

15. In the method of claim 14, including the step of injecting the gas intermittently at the rate of 4 to 100 cycles per second.

16. In the method of claim 11, including the steps of injecting the gas through the probe and head provided with a plurality of laterally directed orifices communicating with said cavity;

and longitudinally oscillating a valve nested within said probe intermittently opening and closing said orifices feeding minute amounts of pressurized gas into the continuously injected plastic material.

17. In the method of claim 16, the preliminary step of retracting the probe head within the bottom mold member blocking said orifices;

the intermediate step after closing the mold of advancing the probe exposing said orifices to the mold cavity;

and the final step after the internal corrugated body has been formed in the mold cavity of retracting the probe within the bottom mold to permit the plastic material to seat the hole in the plastic part left by the retrcted probe.

18. In the method of claim 11, said inert gas being at a pressure in the range of 300 to 1500 pounds per square inch.

19. In the method of claim 11, the further step after the starting of injecting a small amount of plastic material to form said skin within said cavity, of starting injection of inert gas into the cavity;

continuing said injection of gas for a predetermined interval corresponding to the time of filling said cavity with plastic material;

interrupting the injection of plastic material and injection of gas into said cavity;

cooling the plastic structural part to permit same to solidify as an integral unit;

and venting the mold cavity to atmosphere to relieve pressure from the internally corrugated plastic part.

20. In the method of claim 19, including the step of alternately opening and closing the probe passage and orifices to intermittently inject said inert gas into the mold cavity.

21. In the method of claim 19, including the step of intermitttently injecting said inert gas in the range of 4 to 100 cycles per second.

22. In the method of claim 11, wherein the probe has a retracted position in addition to its extended position, the further steps of:

retracting the probe from the interior of said mold cavity after the part is molded; and permitting the plastic material to seal the hole in the corrugated plastic part left by the retracted probe.

* * * * *